3,163,672
PREPARATION OF DL-LYSINE
Robert J. Wineman, Concord, Mass., and Eu Phang T. Hsu, Crestwood, Mo., assignors to Monsanto Company, a corporation of Delaware
No Drawing. Filed Aug. 1, 1960, Ser. No. 46,331
3 Claims. (Cl. 260—534)

This invention relates to a new and useful method for preparing DL-lysine which is one of the essential amino acids required for proper growth of humans and animals.

According to the prior art, DL-lysine has been prepared by using 2-oxo-hexamethyleneimine (ε-caprolactam) as the starting material in which the lactam ring has been hydrolytically cleaved prior to halogenation and amination with an additional blocking group introduced for the protection of the ε-amino group (Eck and Marvel, J. Biol. Chem. 106, 387–1934). The compound ε-caprolactam lends itself well as a starting material for the synthesis of DL-lysine, since it contains all the necessary carbons and one nitrogen atom.

The primary purpose of this invention is to provide a novel method of preparing DL-lysine in which satisfactory yields are obtained. A further object is to provide a new and useful synthesis of DL-lysine in which ε-caprolactam is first halogenated before hydrolytically cleaving the lactam ring. Further purposes of this invention will be apparent from the following description.

In accordance with this invention it has been found that DL-lysine can be prepared in satisfactory yields from variously halogenated 2-oxo-hexamethyleneimines or halogenated ε-caprolactams which are derived from ε-caprolactam as a starting material. One method for obtaining the monohalogenated 2-oxo-hexamethyleneimine is described in application Serial Number 556,106 filed December 29, 1955, now abandoned, while a method for obtaining the dihalogenated 2-oxohexamethyleneimine is described in application Serial Number 549,187 filed November 25, 1955, now Patent No. 2,836,592. In addition $\alpha,\alpha$-dihalo-ε-caprolactam may be readily obtained by halogenating ε-caprolactam in the presence of $PCl_5$, while α-bromo-ε-caprolactam may be obtained by direct bromination of α-caprolactam. α-Chloro-ε-caprolactam may be prepared by low pressure reduction of $\alpha,\alpha$-dihalo-ε-caprolactam with hydrogen.

The aforementioned halogenated 2-oxohexamethyleneimines, such as 3-chloro-2-oxohexamethyleneimine, may be first aminated with an excess of anhydrous ammonia at 120° C. for approximately an hour. If the resulting amination products are hydrolyzed with hydrochloric acid, 25 to 33% yields of DL-lysine are obtained. Aminations at lower temperatures and longer times gave yields of the same order of magnitude. For example, excess ammonia at 70° C. for 12 hours and subsequent hydrochloric acid hydrolysis produced a 45% conversion to DL-lysine where α-chloro-ε-caprolactam was the starting material. Similarly the amination of α-bromo-ε-caprolactam at 70° C. for five hours using an excess of ammonia and subsequent hydrolysis thereof produced a 44% DL-lysine yield.

The DL-lysine was also prepared by preliminarily reacting the α-halo-ε-caprolactams with acylating agents to form an intermediate acyl compound which has subsequently aminated and hydrolyzed to form the DL-lysine. For example, 3,3-dichloro-2-oxohexamethyleneimine was reacted with an excess of acetic anhydride in the presence of sodium acetate to produce 1-acetyl-3,3-dichloro-2-oxohexamethyleneimine. In the same manner the di-bromo, monochloro, and monobromo-2-oxohexamethyleneimines were acylated. The resulting acylated halo-2-oxohexamethyleneimines were then aminated with an excess of ammonia or reductively aminated in the case of the dihalo 2-oxohexamethyleneimines and hydrolyzed with hydrochloric acid as above to give 38–46% yields of DL-lysine. Where benzoyl chloride was used instead of acetic anhydride to form 1-benzoyl-3-halo-2-oxohexamethyleneimine, which was then subsequently aminated and hydrolyzed, poorer results were obtained. For example, only 12% DL-lysine was obtained from 1-benzoyl-3-chloro-2-oxohexamethyleneimine after amination and hydrolysis thereof.

The mono- and dihalo-ε-caprolactams may also be subjected to hydrochloric acid hydrolysis resulting in the formation of the corresponding 6-amino-2-mono or 2,2-dihalo-hexanoic acid hydrochlorides which may be readily acylated, for example, by using acetic acid, acetic anhydride, and sodium acetate to form the corresponding 6-acetamido-2-halohexanoic acids. Amination of 6-acetamido-2-chlorohexanoic acid, 6-acetamido-2-bromohexanoic acid, and reductive amination of 6-acetamido-2,2-dichlorohexanoic acid, and 6-acetamido-2,2-dibromo-hexanoic acid followed by hydrochloric acid hydrolysis resulted in yields of 57, 60, 27 and 25% respectively, of DL-lysine.

Although anhydrous ammonia was the preferred aminating agent, others may be used such as benzylamine, potassium phthalimide, ammonium carbonate and ammonium acetate. In addition acylation may be effected by other than of acetic anhydride, sodium acetate and acetic acid. For example, benzoyl chloride with pyridine may be used. In addition the following may be used: (a) propionyl chloride and sodium propionate; (b) butyryl chloride and sodium butyrate; and (c) acetyl chloride and sodium acetate.

The amination step may be carried out in the presence of various catalysts and solvents, e.g. $AgNO_3$, $H_2O$, phenol, sodamide, acetamide, acetic acid, and urea, but the presence of these reagents does not appear to improve the yield any appreciable amount.

As illustrative of the process of this invention but not limitative thereof are the following examples:

*Example I*

An autoclave was charged with 5.9 grams of α-chlorocaprolactam and 50 grams of anhydrous ammonia and heated at 70° C. for 12 hours. The autoclave was then vented and the residue dissolved in water except for 1 gram which proved to be the starting material. The aqueous solution containing 46% of the theoretical chloride ion was extracted with chloroform four times. The aqueous solution was then hydrolyzed by boiling with 10 ml. of concentrated HCl for one hour. The water was then removed by distallation under reduced pressure, and the residue treated with ethanol and filtered. The alcoholic solution was adjusted with pyridine to a pH of 4, and upon standing a solid separated which was collected by filtration. The resulting crude DL-lysine monohydrochloride was purified in water and reprecipitated from ethanol. A 45 percent yield of the product was obtained which had a melting point of 253.0–253.5° C.

*Example II*

The procedure of the previous example was repeated except that the α-chlorocaprolactam and excess of anhydrous ammonia are heated for one hour at a temperature of 120° C. A 33 percent yield of the crude DL-lysine was recovered.

*Example III*

The procedure of Example I was repeated but α-bromocaprolactam was used except the heating was continued for only 5 hours which resulted in a yield of 44% of DL-lysine monohydrochloride.

Example IV

To a suitable reaction vessel was added 27.2 grams of α,α-dichlorocaprolactam and 20 milliliters of acetic anhydride which were heated at 110 to 120° C. for 80 minutes. The excess anhydride and acetic acid were removed in vacuo. Upon vacuum distillation the product 1-acetyl-3,3-dichloro-2-oxohexamethyleneimine having a boiling point of 100.5–102° C. was collected which represented an 86.4 percent yield. To 11.2 parts by weight of this product were added 70 parts by weight of anhydrous ammonia as a solvent. Two parts by weight of 5 percent palladium on charcoal was added and the resulting mixture was agitated and heated at 70° C. for two hours. Hydrogen at 1350 pounds p.s.i. was added and the mixture reduced for 20 minutes. After the excess ammonia was evaporated, the residue was dissolved in water. This aqueous solution was acidified with hydrochloric acid and hydrolyzed giving a yield of 21.3 percent of lysine hydrochloride.

Example V

The procedure of Example IV was repeated except α,α-dichlorocaprolactam was used with a reaction temperature of 120° C. and a time of 75 minutes which resulted in a low yield of 8.5 percent of DL-lysine monohydrochloride.

Example VI

The α-chlorocaprolactam was acetylated in the same manner as the dichlorolactam in Example IV and gave an 89 percent yield of 1-acetyl-3-chloro-2-oxohexamethyleneimine of which 9.5 parts by weight were dissolved in 32 parts by weight of ammonia and heated in an autoclave for four hours at 75 to 100° C. After evaporation of the ammonia the residue was dissolved in water which was acidified with concentrated hydrochloric acid and refluxed for one hour. The solution resulting therefrom was evaporated to dryness under reduced pressure, and the residue treated with absolute ethanol. The insoluble ammonium chloride was removed by filtration and washed with ethanol. The combined filtrate and wash of 100 ml. was treated with pyridine so as to give a pH of 4. After standing overnight the precipitated DL-lysine monohydrochloride was filtered, washed with ethanol, and dried giving a yield of 33 percent.

Example VII

The procedure of the previous example was repeated except the amination was conducted at 120° C. for one hour in a 20 molar excess of ammonia in the presence of a catalytic amount of potassium iodide followed by hydrolysis and resulted in a yield of DL-lysine of 36 percent.

Example VIII

The procedure of Example VI was repeated except the amination was in the presence of a catalytic amount of nickel nitrate in which case a yield of 38.5 percent DL-lysine was obtained.

Example IX

α-Bromocaprolactam was acylated in the same manner as the α-chlorocaprolactam of Example VI and gave a yield of 94.6 percent of 1-acetyl-3-bromo-2-oxohexamethyleneimine, of which 11.7 parts by weight were dissolved in 45 parts by weight of anhydrous ammonia heated for 2.5 hours from 83–90° C. The DL-lysine monohydrochloric was then isolated as set forth in Example VI and resulted in a yield of 32.9 percent.

Example X

A suitable reaction flask was charged with α-chlorocaprolactam dissolved in pyridine. A stoichiometric proportion of benzoyl chloride was added with agitation over a period of 20 minutes and then allowed to stand at room temperature for 16 hours. The solid pyridine hydrochloride was filtered off and the filtrate was evaporated to dryness, washed with ethanol, and dried to give a 72.5 percent yield of 1-benzoyl-3-chloro-2-oxohexamethyleneimine, which was aminated with a 20 molar excess of anhydrous ammonia by heating at 120° C. for 1 hour. The reaction product was then hydrolyzed with hydrochloric acid as set forth in Example VI. Analysis of the resulting hydrolysis mixture indicated a 12.6 percent yield of DL-lysine.

Example XI

Using the same procedure given in Example IV but omitting the acetylation step and using a reaction period of 75 minutes and a temperature of 120° C., an 8% yield of DL-lysine hydrochloride was obtained.

Example XII

Ten grams of α,α-dichlorocaprolactam were refluxed for 1.5 hours with 40 ml. of water and 20 ml. of 37 percent hydrochloric acid. The water and excess acid was removed in vacuo and the crystalline residue washed with chloroform and acetone. After drying there was obtained a 92 percent yield of 6-amino-2,2-dichlorohexanoic acid hydrochloride of which 4.7 grams were mixed with 30 ml. of acetic acid, 20 ml. acetic anhydride and 2 grams of sodium acetate and stirred at 60° C. for 1 hour. Removal of the volatile reactants at 70° C. in vacuo and treatment of the residue with water gave oil droplets which crystallized upon cooling. The 6-acetamido-2,2-dichlorohexanoic acid so obtained weighed 3.6 grams which represented a 74 percent yield. A 1.21 gram fraction of the 6-acetamido-2,2-dichlorohexanoic acid was dissolved in 25 grams of anhydrous ammonia containing .5 gram of 5 percent palladium on charcoal and then heated at 120° C. for two hours while being agitated. Hydrogen at 1200 p.s.i. was admitted and the mixture allowed to undergo reduction for 30 minutes. After venting the excess hydrogen and ammonia the residue was dissolved in water and filtered free of catalyst. Upon the usual hydrolysis with hydrochloric acid, a 27 percent yield of DL-lysine hydrochloride was obtained.

Example XIII

Five grams of α,α-dibromocaprolactam were refluxed for 25 hours with 10 ml. of water, 10 ml. of 37 percent hydrochloric acid, and 10 ml. of ethanol. The solvents and excess acid were removed in vacuo and the residual solid washed with chloroform and acetone which upon drying gave a 65 percent yield of 6-amino-2,2-dibromohexanoic acid hydrochloride. A 5.4 gram fraction of the 6-amino-2,2-dibromohexanoic acid hydrochloride was mixed with 25 ml. of acetic acid, 15 ml. of acetic anhydride, and stirred at 60° C. for 35 minutes. The reaction mixture was allowed to stand 16 hours. Removal of the volatile reactants at 70° C. in vacuo and treatment of the residue with water gave upon cooling a 43 percent yield of crystalline 6-acetamido-2,2-dibromohexanoic acid which was aminated under the same conditions set forth in Example XII except that the amination time was 25 minutes and the yield of DL-lysine hydrochloride was 25 percent.

Example XIV

In a suitable reaction chamber 5.5 grams of α-chlorocaprolactam was refluxed for one hour with 15 ml. of water and 5 ml. of 37 percent hydrochloric acid. Removal of the excess water acid and water in vacuo left a glass-like residue. Upon stirring and washing repeatedly with ether, a crystalline solid was obtained which was separated by filtration and dried. The 6-amino-2-chlorohexanoic acid hydrochloride weight was 6.1 grams and represented a 95 percent yield. A 2.05 gram fraction of the 6-amino-2-chlorohexanoic acid hydrochloride was then dissolved in a mixture of 15 ml. of acetic acid, 10 ml. of acetic anhydride, and 1 gram of sodium acetate. This mixture was stirred at 60° C. for one hour and the excess reactants removed in vacuo. Upon addition of water to the residue an oily phase separated which was extracted with ethyl acetate. The extract was treated with sodium sulfate, filtered, and the solvent removed which gave a 95 percent yield of 6-acetamido-2-chlorohexanoic acid which crystallized after standing two days. The 6-acetamido-2-chlorohexanoic acid was aminated at 120° C. for one hour in the presence of a 20 molar excess of anhydrous ammonia and the hydrochloric acid hydrolysis was done as in Example VI above with a DL-lysine hydrochloride yield of 57 percent.

*Example XV*

In a suitable reaction flask 3.82 grams of α-bromocaprolactam were refluxed for one hour with 10 ml. of water and 5 ml. of 37 percent hydrochloric acid. The dried 6-amino-2-bromohexanoic acid hydrochloride was obtained in a 96 percent yield by using the same procedure described in Example XIV above. The 6-acetamido-2-bromohexanoic acid was then obtained in a 94.1 percent yield by using the same reactants disclosed in Example XIV above and in the same stoichiometric proportions. This was followed by the same amination and hydrochloric acid hydrolysis shown in Example XIV above except a yield of 60 percent DL-lysine hydrochloride was obtained.

This application is a continuation-in-part of copending application Serial No. 712,633, filed February 3, 1958, now abandoned.

While this invention has been described with respect to certain embodiments, it is not so limited, and it is to be understood that variations and modifications thereof may be made without departing from the intended scope of this invention.

The embodiments of the invention in which an exclusive property or privilege is claimed are defined as follows:

1. A method which comprises the steps of reacting 3-halogenated 2-oxohexamethyleneimine, in which the halogen is selected from the group consisting of chlorine and bromine, with an acylating agent selected from the group consisting of acetic anhydride and benzoyl and lower alkanoyl chloride to form an N-acyl-halogenated caprolactam, contacting said caprolactam with an aminating agent to produce an N-acyl lysine lactam, and hydrolyzing the latter to DL-lyine in the form of the mineral acid salt thereof by reacting said lactam with a mineral acid.

2. A method which comprises the steps of reacting 3-chloro-2-oxohexamethyleneimine with acetic anhydride to form an N-acetyl-halogenated caprolactam, contacting said caprolactam with ammonia to produce N-acetyl lysine lactam, and hydrolyzing the latter to DL-lysine in the form of the hydrochloride salt thereof by reacting said lactam with hydrochloric acid.

3. A method which comprises the steps of reacting 3-bromo-2-oxohexamethyleneimine with acetic anhydride to form an N-acetyl-halogenated caprolactam, contacting said caprolactam with ammonia to produce N-acetyl lysine lactam, and hydrolyzing the latter to DL-lysine in the form of the hydrochloride salt thereof by reacting said lactam with hydrochloric acid.

References Cited in the file of this patent

UNITED STATES PATENTS

| | | |
|---|---|---|
| 2,519,038 | Galat | Aug. 15, 1950 |
| 2,564,649 | Rogers | Aug. 14, 1951 |
| 2,731,480 | Kruckenberg | Jan. 17, 1956 |
| 2,832,771 | Francis et al. | Apr. 29, 1958 |
| 2,839,574 | Servigne et al. | June 17, 1958 |
| 2,876,218 | Francis | Mar. 3, 1959 |
| 2,877,220 | O'Neill et al. | Mar. 10, 1959 |

FOREIGN PATENTS

| | | |
|---|---|---|
| 758,895 | Great Britain | Oct. 10, 1956 |